US011039111B2

(12) United States Patent
Gibson et al.

(10) Patent No.: US 11,039,111 B2
(45) Date of Patent: Jun. 15, 2021

(54) MEMS CONTROL METHOD TO PROVIDE TRAJECTORY CONTROL

(71) Applicant: MICROSOFT TECHNOLOGY LICENSING, LLC, Redmond, WA (US)

(72) Inventors: Gregory Theodore Gibson, Seattle, WA (US); Algird Michael Gudaitis, Fall City, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 124 days.

(21) Appl. No.: 16/421,241

(22) Filed: May 23, 2019

(65) Prior Publication Data

US 2020/0374495 A1    Nov. 26, 2020

(51) Int. Cl.
*H04N 9/31* (2006.01)
*G02B 26/08* (2006.01)

(52) U.S. Cl.
CPC ....... *H04N 9/3135* (2013.01); *G02B 26/0833* (2013.01)

(58) Field of Classification Search
CPC .......................... H04N 9/3135; G02B 26/0833
USPC ........................................................ 359/292
See application file for complete search history.

(56) References Cited

U.S. PATENT DOCUMENTS 8,282,222 B2   10/2012   Smits
8,371,698 B2   2/2013    Brown
10,642,025 B2 *  5/2020   Duvdevany .......... G02B 26/105
2008/0144150 A1   6/2008   Champion et al.
2008/0277582 A1   11/2008   Shi et al.
(Continued)

FOREIGN PATENT DOCUMENTS

CN    104038747 A    9/2014
JP    2013065923 A   4/2013
(Continued)

OTHER PUBLICATIONS

Davis, et al., "Trajectory precision of micromachined scanning mirrors for laser beam scanning pico-projector displays", In Proceedings of the SPIE—The International Society for Optical Engineering, Feb. 2, 2012, 11 Pages.
(Continued)

*Primary Examiner* — Mohammed A Hasan
(74) *Attorney, Agent, or Firm* — Workman Nydegger

(57) ABSTRACT

Controlling a mirror in a MEMS based projector. A method includes iteratively performing various acts. The method includes inputting a time domain target wave array, with target elements, to a system for a MEMS coupled to the mirror of the projector. The time domain target wave array includes a set of n target elements. The method further includes driving the driver to move the mirror using elements in a drive array comprising a set of drive elements. The method further includes sampling a time domain output wave for the movement of the mirror to construct an output wave array with output elements corresponding to the target elements. The method further includes identifying errors between the target elements and the output elements. The method further includes modifying the drive elements in the drive array to attempt to minimize the errors when driving the MEMS on subsequent drive cycles.

17 Claims, 6 Drawing Sheets

(56) References Cited

U.S. PATENT DOCUMENTS

2010/0073748 A1* 3/2010 Holmes .................. H02P 29/50
 359/199.1
2010/0314534 A1* 12/2010 Campion ............... G01D 15/00
 250/252.1
2012/0281024 A1 11/2012 Champion

FOREIGN PATENT DOCUMENTS

JP 2016148763 A 8/2016
JP 2017083657 A 5/2017

OTHER PUBLICATIONS

"International Search Report and Written Opinion Issued in PCT Application No. PCT/US20/028169", dated Jul. 20, 2020, 11 Pages.

\* cited by examiner

MEMS CONTROL METHOD TO PROVIDE TRAJECTORY CONTROL

BACKGROUND

Background and Relevant Art

Microelectromechanical systems (MEMS) are microscopic mechanical systems. In particular, using modern semiconductor manufacturing techniques, engineers and scientists have been able to create mechanical systems with moving parts that exist at a microscopic level.

This technology has allowed for the invention of very small devices. One such device is a miniaturized projector. Such miniaturized projectors include lasers emitting light towards two mirrors where the mirrors are coupled to mechanical elements of a MEMS. The MEMS can control the mirrors to perform a raster scan to display video content to a user, where one mirror is configured to control light movement in a horizontal direction and the other mirror is configured to control light movement in a vertical direction. Such projectors can be used in virtual reality and augmented reality applications, or other miniaturized projector applications.

A typical raster scan implements a method of displaying an image using a substantially rectangular pattern by illuminating individual pixels of the rectangle sequentially in an efficient manner by moving one or more mirrors to adjust where output from the lasers is directed. In particular, a raster scan will begin at a top corner at a first side of the rectangle and begin horizontally (and slightly vertically) illuminating pixels in a first row from the first corner of the first side of the rectangle to an opposing corner (approximately) on an opposing second side of the rectangle. Once the opposing side is reached, the signal is blanked during a horizontal blanking interval when the raster scan, without illuminating any pixels, horizontally (and slightly vertically) moves back towards the first side. This process repeats back and forth until the bottom of the rectangle is reached and all of the pixels have been illuminated. The raster scan then performs a blanking operation during a vertical blanking interval, whereby the mirrors are adjusted such that the mirrors are moved from a position that reflects light on a bottom corner at the second side of the rectangle to the top corner at the first side and top of the rectangle. This positions the mirror in the appropriate location for a next frame of video. Often, the frames are displayed at a rate of 120 frames per second.

To accomplish the vertical movements during both the period when the image is being drawn and the vertical blanking interval, a sawtooth wave controls the MEMS coupled to a mirror where the more gradually ramped portion of the sawtooth wave is used to control the vertical position of the light when illuminating a surface and during the horizontal blanking intervals, while the more vertical portion of the sawtooth wave moves the mirror during the vertical blanking interval to move the mirror back into position for a next frame.

The input sawtooth wave signal that controls the MEMS for the vertical movement typically does not precisely match the output sawtooth vertical wave movement of the mirrors. This may be due to any one of a number of different factors including system delays, inertial forces, aging of components in the system, and/or other limitations. Additionally, as with any mechanical device, or other system, there are constraints that need to be met. For example, it is desirable that the ramped portion of the vertical sawtooth wave movement be as linear as possible. In particular, when the ramped portion is not linear, this can cause bunching of geometric shapes, intensities, and/or resolutions. When displayed to a user, this bunching will be perceptible to the user and will degrade the visual experience. Additionally, there are limitations on the acceleration of mechanical components, even at microscopic levels. Thus, the input sawtooth wave signal will typically not be a pure sawtooth, but rather will have rounded transitions so as to attempt to avoid improperly accelerating the mechanical components. Further, the blanking portion of the sawtooth wave, that is the more vertical portion, cannot be completely vertical as the mechanical portions of the system cannot instantaneously cause movement of the mirror for display at the bottom to the top.

Therefore, the input sawtooth wave signal will typically be engineered based on the known characteristics of the MEMS and other portions of the projector. However, as noted previously, while it may be desirable that the output sawtooth wave movement of the mirror be the same as the input sawtooth wave signal, this is often not the actual result. Thus, it is desirable to implement a system where the output wave movement of the mirror matches the input wave signal to the MEMS.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that includes acts for controlling a mirror in a MEMS based projector. The method comprising iteratively performing various acts. The method includes inputting a time domain target wave array, with target elements, to a system for a MEMS coupled to the mirror of the projector. The time domain target wave array includes a set of n target elements. The method further includes driving the driver to move the mirror using elements in a drive array comprising a set of drive elements. The method further includes sampling a time domain output wave for the movement of the mirror to construct an output wave array with output elements corresponding to the target elements. The method further includes identifying errors between the target elements and the output elements. The method further includes modifying the drive elements in the drive array to attempt to minimize the errors when driving the MEMS on subsequent drive cycles.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein implement a multi-servo time-domain MEMS system. In particular, embodiments input into the system a target wave array of elements that represent points on a target waveform, such as an engineered sawtooth waveform for controlling vertical movement of a raster scan in a MEMS based projector. The target wave array is used to generate a drive array with drive elements of the drive array. The drive elements of the drive array are used to drive the MEMS to adjust the vertical mirror according to the drive elements. The actual movement of the vertical mirror is monitored by an angle sensor (such as a Piezo-resistive strain sensor or an optical sensor). The Angle sensor is sampled at various points to create an output wave array with output wave array elements, where the output wave array elements indicate the actual movement of the vertical mirror.

Element by element errors are then calculated between the elements of the target wave array and corresponding elements of the output wave array. These errors are then used by a controller to adjust the drive array elements to attempt to minimize the errors between the target wave array elements and the output wave array elements. Note that in some embodiments, the controller solves a set of linear equations that use the error as input to identify how the drive array elements should be modified.

This controller uses MEMS angle feedback to enforce trajectory control by implementing a time domain servo on a number of points making up the drive waveform A video projector built with MEMS mirrors requires one MEMS to move at the video framerate in a controlled fashion in order to move the laser light source in a raster to paint the image. A controller is needed to control the MEMS to ensure that it follows a precise trajectory. This controller provides a control solution for that slowscan (video frame rate) MEMS device.

Figure 1:
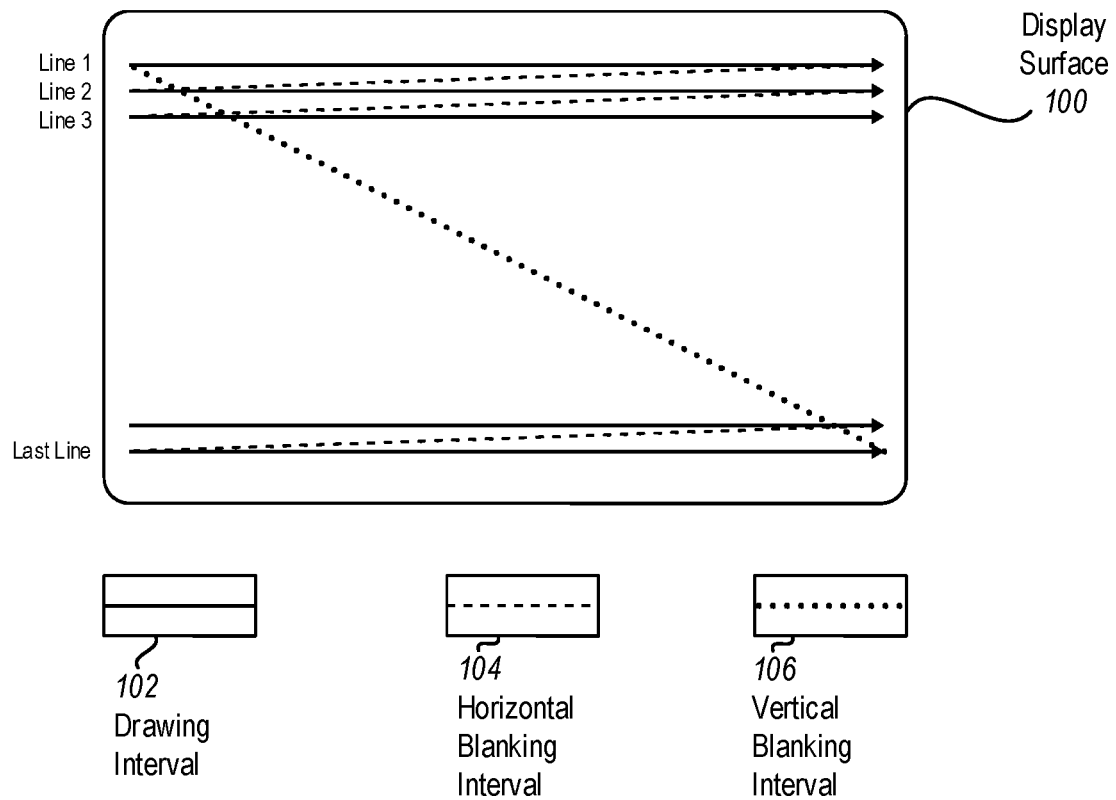
FIG. 1 illustrates a raster scan pattern.

Referring now to FIG. 1, a graphical representation of a typical raster scan on a display surface 100 is shown. In this example, a laser beam path is shown. FIG. 1 illustrates drawing intervals 102, horizontal blanking intervals 104, and a vertical blanking interval 106. To achieve the movement illustrated in FIG. 1, a horizontal mirror and vertical mirror are manipulated to manipulate how light can be reflected from lasers.

The vertical and horizontal reflective movement shown in FIG. 1 of all intervals would be visible on the display surface 100 if the laser was constantly illuminated. However, during the horizontal blanking intervals 104, and the vertical blanking interval 106, the lasers are turned off such that the display surface 100 is not illuminated by the lasers. Thus, as used herein, reflective movement is movement of mirrors that would cause a movement of a reflected beam if the beam were constantly illuminated. However, reflective movement does not require the beam to be illuminated, but rather is used herein as a descriptive term to describe mirror manipulation. Thus, for example horizontal reflective movement of a mirror does not require the mirror to be moved horizontally, but rather simply requires the mirror to be moved such that if a beam were reflected off of the mirror the reflected beam would have horizontal movement.

As illustrated in FIG. 1, there is constant vertical reflective movement. Portions of that vertical reflective movement are in a downward direction and portions of that vertical reflective movement are in an upward direction. In particular, downward vertical reflective movement occurs during the drawing intervals 102 and the horizontal blanking intervals 104. Upward vertical reflective movement occurs during the vertical blanking interval 106.

The downward and upward vertical reflective movement is controlled by manipulation of a vertical mirror as will be discussed in more detail below. In particular, the vertical mirror is manipulated to cause the vertical movement shown on the display surface 100.

Figure 2:
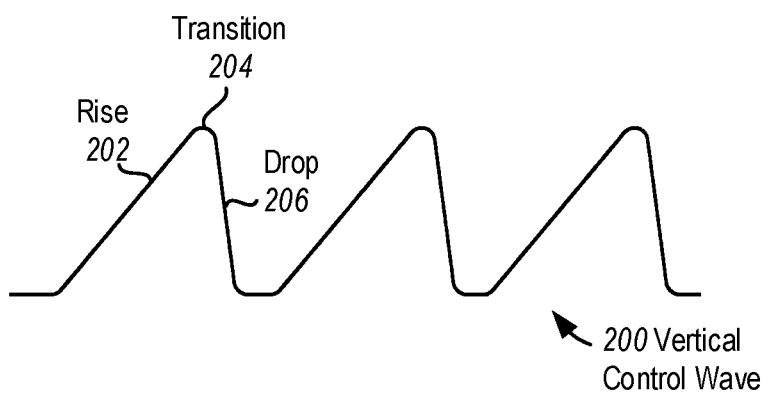
FIG. 2 illustrates a modified sawtooth waveform.

Referring now to FIG. 2, a vertical control wave 200 is illustrated. In the example illustrated, the vertical control wave 200 is a modified sawtooth wave. The vertical control wave 200 has a number of different elements that differ from a classical sawtooth wave. In particular, a classical sawtooth wave will have very abrupt transitions including an abrupt change from upward movement to downward movement including an almost vertical downward drop. In contrast, the vertical control wave, while including a ramped rise 202 (as with a classical sawtooth wave) the vertical control wave 200 includes a softer transition 204 from the upward movement of the rise 202 to the downward movement of the drop 206. Additionally, the drop 206 may not be as steep as in a classical sawtooth wave. The transition 204 and the drop 206 are more moderated due to limitations of systems controlling the vertical mirror. In particular, the mechanical systems cannot instantaneously change their movement as a physical mass will resist changes in both speed and direction. Thus, the vertical control wave 200 is a designer wave configured to control the vertical mirror in a fashion that is appropriate for the components used to control the movement of the vertical mirror. Alternatively or additionally, while the mechanical elements of the vertical mirror and related controls may be able to change speed and direction at a particular rate, that particular rate may cause other undesirable effects when used. For example, changes of the vertical mirror movement at the particular rate may cause a pressure wave, causing noticeable audible artifacts. Thus, the vertical control wave 200 may be engineered to avoid the creation of these audible artifacts.

Figure 3:
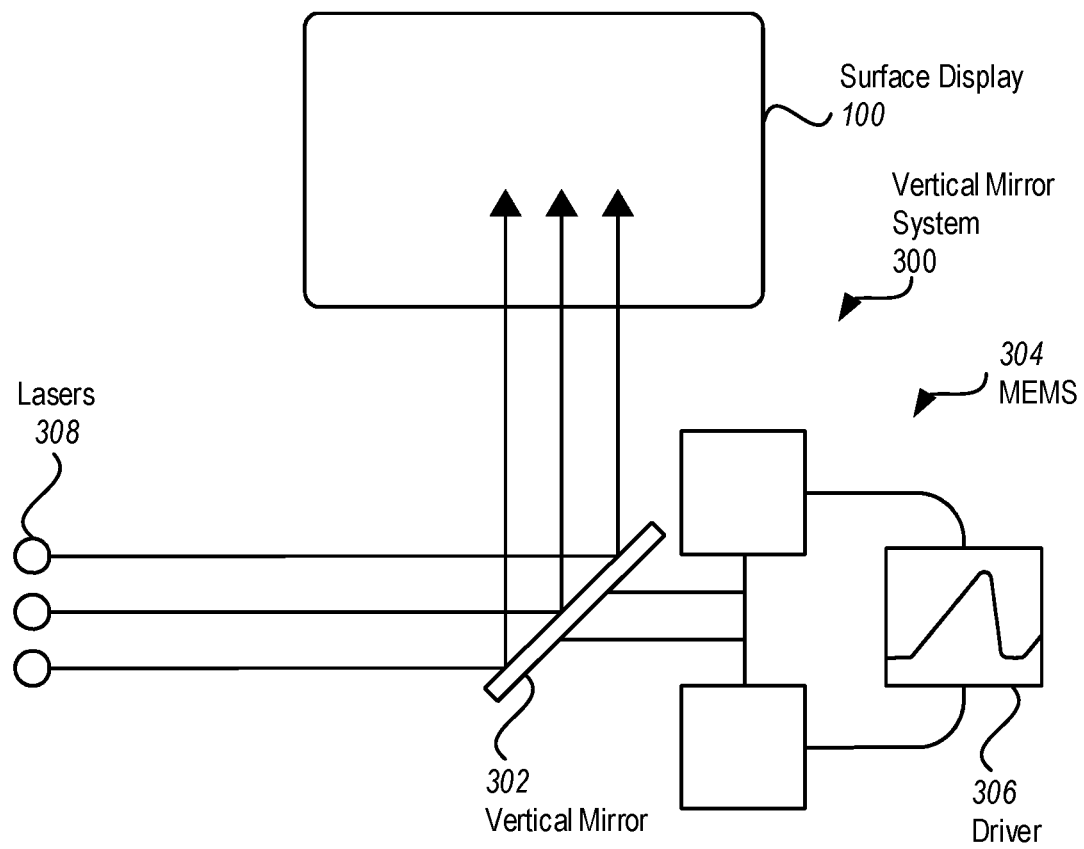
FIG. 3 illustrates a MEMS system for controlling a vertical mirror of a projector.

Referring now to FIG. 3, a vertical mirror system 300 is illustrated. The vertical mirror system 300 includes a vertical mirror 302. Movement of the vertical mirror 302 is controlled by a MEMS 304. The MEMS 304 is controlled by a driver 306. The driver 306 attempts to control movement of the vertical mirror 302 such that the movement of the vertical mirror 302 is consistent with the vertical control wave 200. In particular, the driver 306 will attempt to drive the MEMS 304 to move the vertical mirror 302 in a fashion such that light from the lasers 308 would be reflected off of the vertical mirror 302 and onto the display surface 100 consistent with the vertical movement shown in FIG. 1 if the lasers 308 were constantly illuminated. Again, it should be noted that the lasers are not illuminated during the horizontal blanking interval 104 and the vertical blanking interval 106.

Note that while it is desirable that the movement of the vertical mirror 302 be manipulated in a fashion defined by the vertical control wave 200, it is often the case that such movement cannot be strictly achieved. That is, in an open-loop system, if the driver 306 were to simply drive the MEMS 304 using the vertical control wave 200, the movement of the mirror 302 would not match the vertical control wave 200. This may be due to aging components in the MEMS 304, aging components in the driver 306, manufacturing differences between different instances vertical mirror systems, the mass of components in the vertical mirror system 300, or for other reasons.

Figure 4:
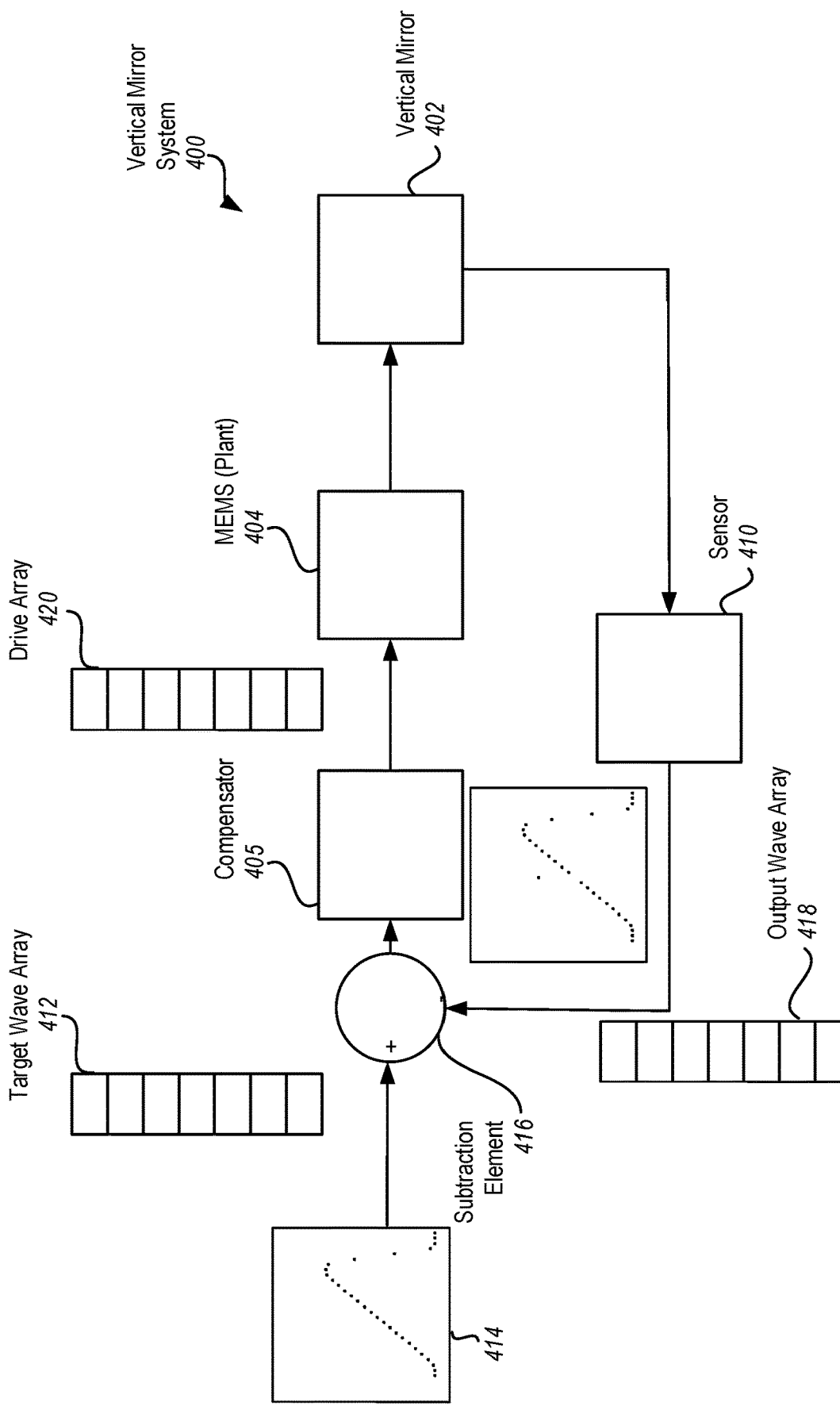
FIG. 4 illustrates a control system for correcting errors in the output of a MEMS system.

Embodiments illustrated herein implement a controller that directly servos each of several control points used to establish a drive waveform used to drive the driver 306. The controller operates in the time domain. The controller is able to use many different basis functions such as square, Gaussian, triangle, etc.

referring now to FIG. 4, a vertical mirror system 400 is illustrated. The vertical mirror system 400 includes a MEMS 404 configured to cause a vertical mirror, such as the vertical mirror 302 illustrated in FIG. 3, to move. The MEMS 404 is driven by a compensator 405 which will be discussed in more detail below. A sensor 410 monitors the actual movement of the vertical mirror 402.

Illustrating now a functional example, a vertical control wave such as the vertical control wave 200 illustrated in FIG. 2 is modeled with a digital model. In particular, the digital model for the vertical control wave 200 is the target wave array 412 illustrated in FIG. 4. The target wave array 412 can be described as a sampled version of the vertical control wave 200. That is, the target wave array 412 includes distinct values representative of samples over time of the vertical control wave 200. Typically, the target wave array 412 will include samples for one cycle of the vertical control wave 200. Note that the embodiments illustrated herein allow for the use of very efficient target wave arrays, in that the target wave arrays can have a relatively low number of sample points as compared to systems based on frequency domain controls. In particular, while a frequency domain controlled system may use thousands of samples to define a target wave, by using a time domain target wave array as shown, the target wave array may have 50 samples.

As noted, the samples include a magnitude value correlated to time on a per cycle basis. That is, each element of the target wave array 412 includes a magnitude value. Further, each element corresponds to a particular time in one cycle of the vertical control wave 200. A graphical representation 414 shows what the values of the target wave array 412 might look like if plotted against time.

The target wave array 412 is provided to a subtraction element 416. The subtraction element determines the difference between the target wave array 412 and output wave array 418. In particular, the sensor 410 samples the movement of the vertical mirror 402 to create an output wave array 418 that describes the actual movement of the vertical mirror 402. In an optimal case, the output wave array 418 will have elements that are exactly the same value as the elements of the target wave array 412. However, due to the various factors described above, this is often not the case. Therefore, the subtraction element 416 computes the differences between the elements of the target wave array 412 and the output wave array 418. This difference is then provided to the compensator 405.

Returning once again to details of the subtraction element 416, the subtraction element 416 may be implemented in a number of different fashions. For example, in some embodiments, the subtraction element 416 may be implemented using one or more amplifier circuits. Alternatively or additionally, the subtraction element 416 may be a hardware device that includes two sets of registers, one set for storing the values in the target wave array 412 and one set for storing the values in the output wave array 418. The subtraction element 416 may further include hardware-based arithmetic elements and/or processors and computer software configured to perform arithmetic evaluation of the differences between the elements in the registers.

As described previously, these differences can be provided to the compensator 405 and used as will be described in more detail below.

The sensor 410 may be implemented in a number of different fashions. For example, the sensor 410 may be a Piezo-resistive strain sensor coupled to the vertical mirror 402 to detect movement of the vertical mirror 402, which can be used to create the output wave array 418. That is, the magnitude of the movement of the vertical mirror 402 can be converted to values stored in the output wave array 418 at various times corresponding to times in a cycle of vertical mirror movement.

Alternatively or additionally, the sensor 410 may be implemented using optical sensors configured to monitor reflection of the lasers 308 onto the display surface 100. That is, the sensor 410 can monitor the vertical reflective movement, especially during the drawing intervals 102, to identify values for the output wave array 418.

As noted previously, the output from the subtraction element 416, which represents the error between the target wave array 412 and the output wave array 418, is provided to the compensator 405. The compensator 405 includes elements to compensate for this error to attempt to reduce the error to zero over a number of different cycles. This is accomplished by the compensator 405 generating a drive array 420, which is a compensated version of the target wave array 412, which is provided to the MEMS 404 for moving the vertical mirror 402. The compensator can include various hardware based arithmetic elements and/or processors and computer executable instructions to perform the various computations and array generation.

Continuing the present example, the movement of the vertical mirror 402 is sensed by the sensor 410 to create the output wave array 418 which is provided to the subtraction element 416, where the subtraction element 416 compares the output wave array 418 to the target wave array 412 to update the error provided to the compensator 405, which updates the drive array 420, where elements of the drive array 420 are used to drive the MEMS 404 to move the vertical mirror 402. The process continues in this fashion iteratively measuring error and adjusting the drive array 420 to compensate for the error.

Attention is now, once again, directed to the details of the vertical mirror system 400. The vertical mirror system 400 works by comparing output from the sensor 410 (i.e. MEMS angle feedback), in the form of the output wave array 418 to the target wave array 412 in response to the drive array 422 applied to the MEMS 404 to compute an error signal. The vertical mirror system 400 operates on complete frames of data and maintains an integration of the error signal at each control point which is used as the drive signal (in the form of the drive array 422) for the high bandwidth loop driving the MEMS.

However, due to the nature of the MEMS 404, there is a propagation delay through the MEMS 404 such that the raw integration result is not an effective drive signal. In some embodiments, the transfer function of the MEMS plant combined with the high bandwidth controller is learned through a series of impulse responses and captured in a coefficient matrix. The inverse of the coefficient matrix can be multiplied by the error signal to exactly account for the characteristics of the MEMS plant. This inverse matrix can be included in the compensator 405, along with computational hardware and/or software, to cause the error signal produced by the subtraction element 416 to be multiplied by the inverse matrix.

Figure 5:
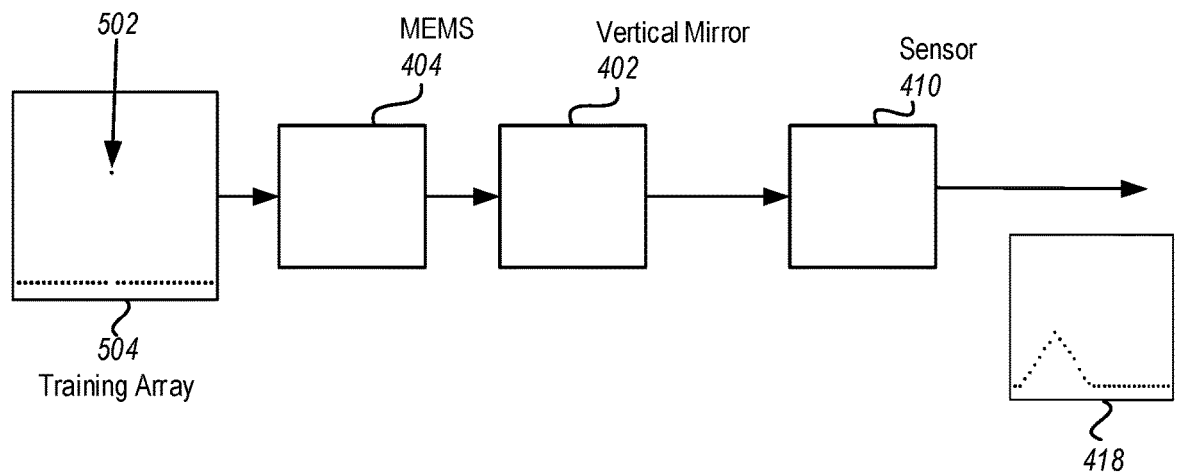
FIG. 5 illustrates a system for training a control system.

As alluded to above, embodiments may include functionality for training the compensator 405 to have the appropriate operand elements to compensate for differences between the target wave array 412 and the output wave array 418. In some embodiments, this may be done by identifying the impulse response of the MEMS 404. For example, FIG. 5 illustrates an example where one element 502 of a training array 504 is set at an impulse value while other values of the array 504 are set to 0. This training array is provided to the MEMS 404 and the sensor 410 senses the resulting movement of the vertical mirror 402. Note that due to mechanical constraints, system delays, and other factors, an impulse input may cause a response that is significantly different than the impulse input. That is, while the impulse input is directed to a single element of the training array 504, multiple outputs elements of a resulting output wave array 418 may be affected. Thus, embodiments will perform an impulse input by appropriately modifying the training array 504 multiple times such that each element of the training array 504 can be input as an impulse input into the MEMS 404 and an output wave array 418 generated for each of the impulse inputs. Thus, for example, if the training array 504 has 50 elements, calibration is performed by inputting 50 different iterations of the training array 504, where each iteration has a different element as an impulse element into the MEMS 404. Similarly, 50 different output wave arrays are collected, one for each input of the training array 504.

In some embodiments, the input training arrays and the output wave arrays from the calibration process can be used to construct the matrix used by the compensator 405. That is, a set of equations can be created where the input is used as one variable and corresponding equations for each element of the output wave are generated.

Note that some embodiments may include additional types of feedback and compensation. For example, in some embodiments, the MEMS 404 may include internal feedback and compensation to compensate for various acute conditions. For example, attention is now directed to FIG. 6 which shows the MEMS 404. In this example, the MEMS 404 includes micromechanical elements 602, which are the physical mechanical elements coupled to a mirror, such as the vertical mirror 402. The MEMS 404 may further include a compensator 604. The compensator 604 receives as input the difference between data in the drive array 420 and the output wave array 418. This allows the MEMS 404 to compensate for acute issues such as sudden bumps or movements to a projector implementing the vertical mirror system 300, sudden temperature changes, or other acute issues.

Figure 7:
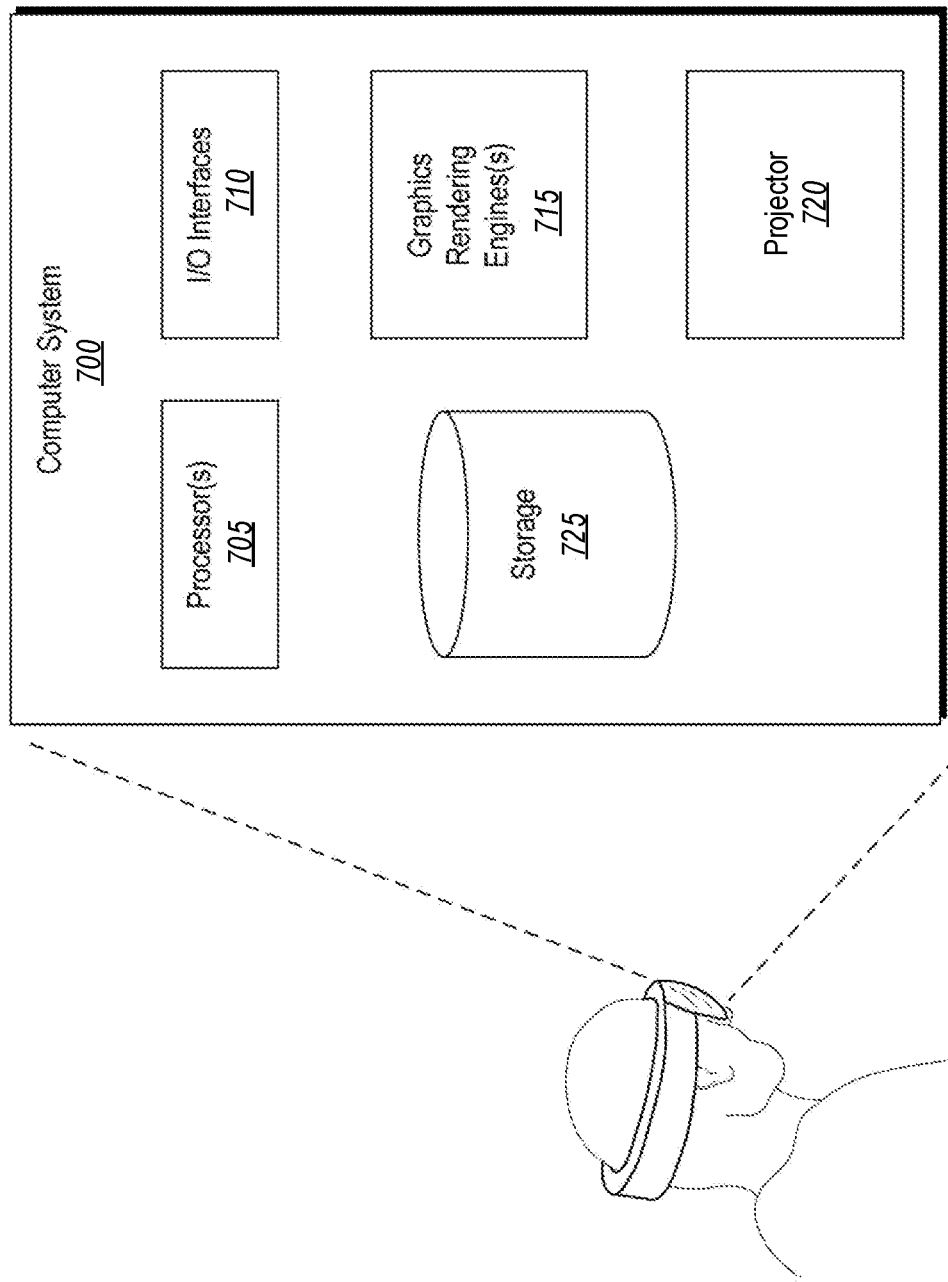
FIG. 7 illustrates a computer system.

Having just described the various features and functionalities of some of the disclosed embodiments, attention is now directed to FIG. 7, which illustrates an example computer system 700 that may be used to facilitate the operations described herein. It will be appreciated that, in some instances, aspects of the systems illustrated and the computer system 700 shown in FIG. 7 can be used in combination to carry out the embodiments described herein.

The computer system 700 may take various different forms. For example, in FIG. 7, the computer system 700 is embodied as a head-mounted display (HMD). Although the computer system 700 may be embodied as an HMD, the computer system 700 may also be a distributed system that includes one or more connected computing components/devices that are in communication with the HMD. Accordingly, the computer system 700 may be embodied in any form and is not limited strictly to the depiction illustrated in FIG. 7. By way of example, the computer system 700 may include a projector, desktop computer, a laptop, a tablet, a mobile phone, server, data center and/or any other computer system.

In its most basic configuration, the computer system 700 includes various different components. For example, FIG. 7 shows that computer system 700 includes at least one hardware processing unit 705 (aka a "processor"), input/output (I/O) interfaces 710, graphics rendering engines 715, a projector 720, and storage 725. More detail on the hardware processing unit 705 will be presented momentarily.

The storage 725 may be physical system memory, which may be volatile, non-volatile, or some combination of the two. The term "memory" may also be used herein to refer to non-volatile mass storage such as physical storage media. If the computer system 700 is distributed, the processing, memory, and/or storage capability may be distributed as well. As used herein, the term "executable module," "executable component," or even "component" can refer to software objects, routines, or methods that may be executed on the computer system 700. The different components, modules, engines, and services described herein may be implemented as objects or processors that execute on the computer system 700 (e.g. as separate threads).

The disclosed embodiments may comprise or utilize a special-purpose or general-purpose computer including computer hardware, such as, for example, one or more processors (such the hardware processing unit 705) and system memory (such as storage 725), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and no limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 700 may also be connected (via a wired or wireless connection) to external sensors (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses. FIG. 1. Further, the computer system 700 may also be connected through one or more wired or wireless networks to remote systems(s) that are configured to perform any of the processing described with regard to computer system 700.

During use, a user of the computer system 700 is able to perceive information (e.g., a mixed-reality environment) through a display screen that is included among the I/O interface(s) 710 and the projector 720 that is visible to the user. The I/O interface(s) 710 may include the input elements described herein, which are linked to one or more underlying applications.

The I/O interface(s) 710 and sensors may also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The graphics rendering engine 715 is configured, with the hardware processing unit 705 and the projector 720, to render one or more virtual objects within the scene. As a result, the virtual objects accurately move in response to a movement of the user and/or in response to user input as the user interacts within the virtual scene.

A "network," is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 700 will include one or more communication channels that are used to communicate with the network 735. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the hardware processing unit 705). For example, and without limitation, illustrative types of hardware logic components that can be used include Field-Programmable Gate Arrays (FPGAs), Application-Specific Integrated Circuits (ASICs), Application-Specific Standard Products (ASSPs), System-On-A-Chip Systems (SOCs), Complex Programmable Logic Devices (CPLDs), Central Processing Units (CPUs), and other types of programmable hardware.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
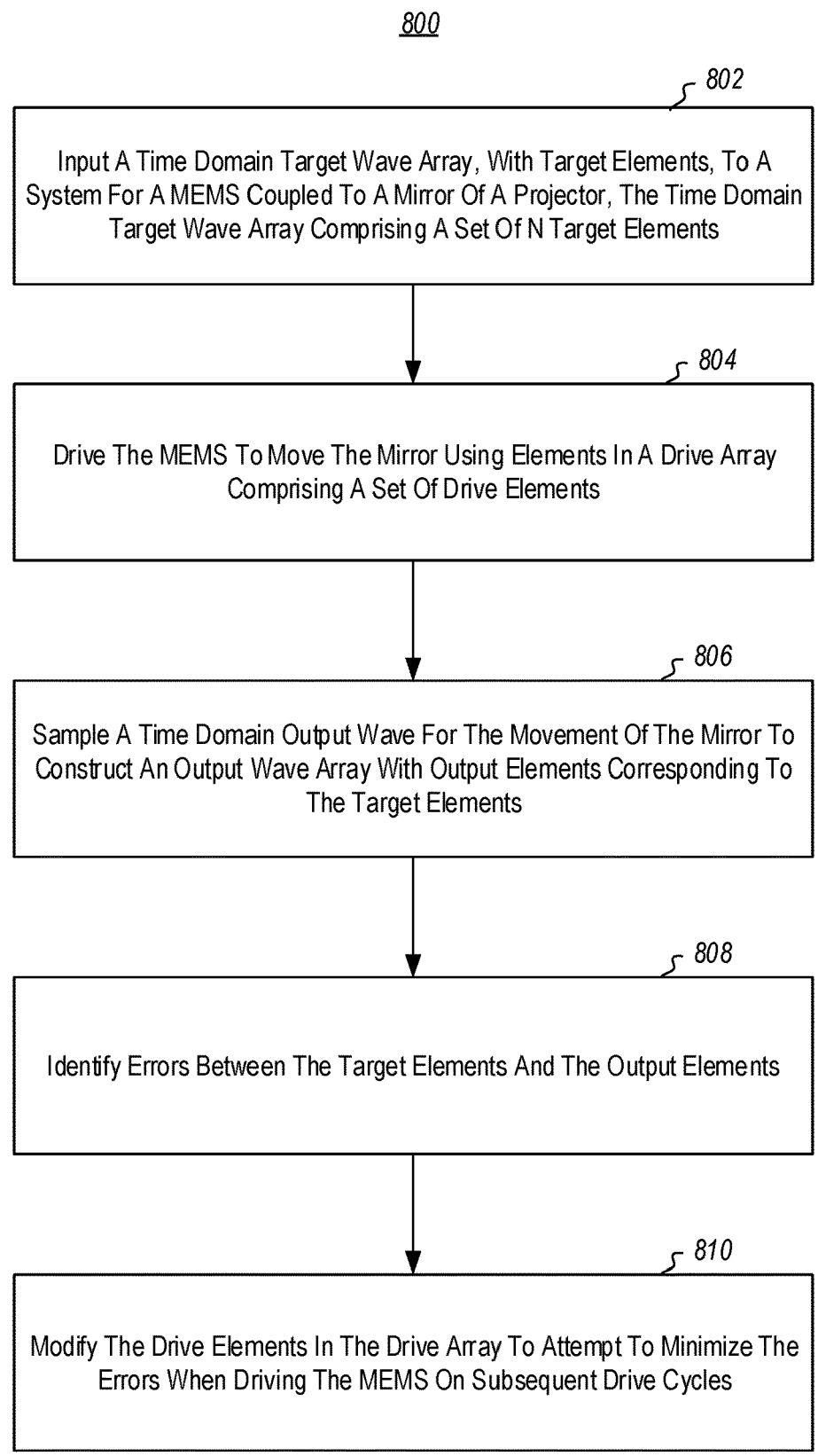
FIG. 8 illustrates a method of controlling a mirror in a MEMS based projector.

Referring now to FIG. 8, a method 800 is illustrated. The method includes acts for controlling a mirror in a MEMS based projector. The method includes iteratively performing a number of acts.

The method includes inputting a time domain target wave array, with target elements, to a system for a MEMS coupled to the mirror of the projector (act 802). The time domain target wave array includes a set of n target elements. For example, FIG. 4 illustrates a target wave array 412 that can be provided to the vertical mirror system 400.

The method 800 further includes driving the MEMS to move the mirror using elements in a drive array comprising a set of drive elements (804). For example, the drive array 420 can be used to drive the MEMS using the elements in the drive array 420. The drive array 420 is based in an error between the target wave array 412 and the output wave array 418, as operated on by the compensator 405. In the first frame, the error will essentially be the values target wave array 412, as the vertical mirror 402 will not have moved in the first cycle. However, over subsequent cycles, the error is reduced as the vertical mirror 402 moves.

The method 800 further includes sampling a time domain output wave for the movement of the mirror to construct an output wave array with output elements corresponding to the target elements (act 806). As illustrated in FIG. 4, the sensor 410 samples the movement of the vertical mirror 402 to construct the output wave array 418.

The method 800 further includes identifying errors between the target elements and the output elements (act 808). For example, the subtraction element 416 may identify errors, on an element by element basis, between the target wave array 412 and the output wave array 418.

The method 800 further includes modifying the drive elements in the drive array to attempt to minimize the errors when driving the MEMS on subsequent drive cycles (810). For example, the compensator 405 may be configured to use the error from the subtraction element 416, and operate on that error to change the drive array 420 elements to reduce the error on subsequent frames.

The method 800 may be practiced where modifying the drive elements comprises solving a set of linear equations defining n response outputs to n inputs to the driver. In some such embodiments, solving the set of linear equations comprises applying a matrix to the errors.

The method 800 may further include performing calibration for the act of modifying the drive elements by individually driving the input of the driver with an impulse input for each of the drive elements to identify an impulse response for each output element. An example of this is illustrated in FIG. 5.

The method 800 may be practiced where sampling a time domain output wave for the movement of the mirror to construct an output wave array with output elements corresponding to the target elements comprises sampling of movement of the mirror using a Piezo-resistive strain sensor.

Figure 6:
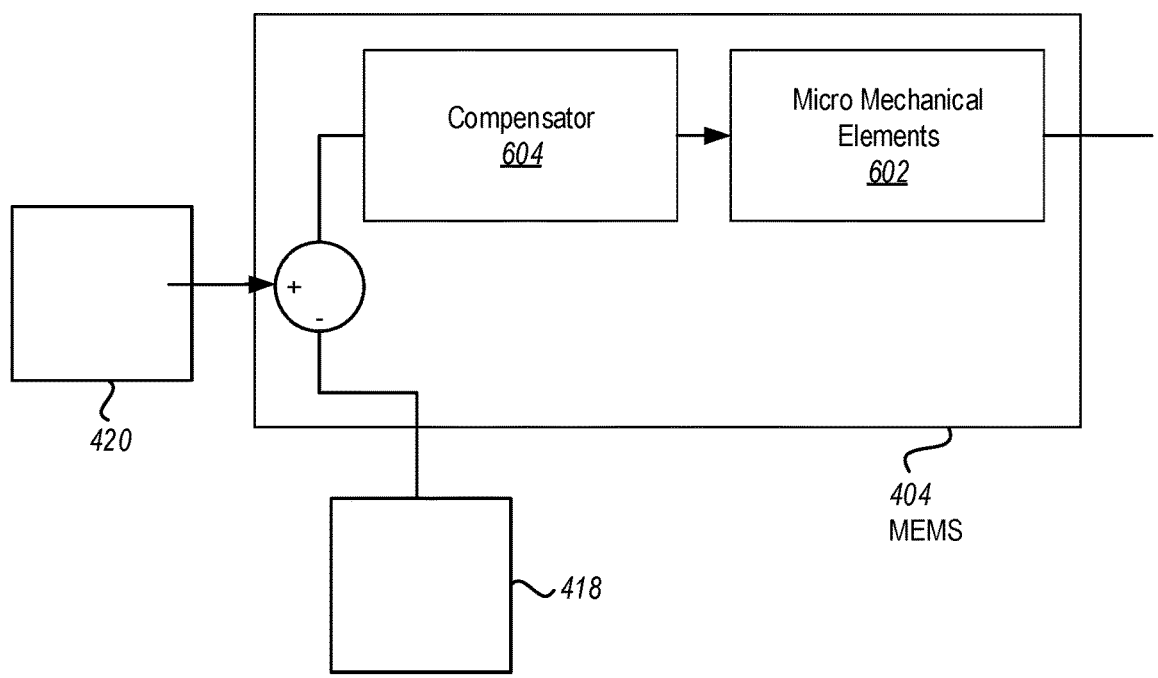
FIG. 6 illustrates internal error compensation of a MEMS system.

The method 800 may further include Identifying errors between the drive elements and the output elements and driving the driver to reduce the errors between the drive elements and the output elements. An example of this is illustrated in FIG. 6.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of controlling a mirror in a MEMS based projector, the method comprising iteratively performing the following:
    inputting a time domain target wave array, with target elements, to a system for a MEMS coupled to the mirror of the projector, the time domain target wave array comprising a set of n target elements;
    driving a driver to move the mirror using elements in a drive array comprising a set of drive elements;
    sampling a time domain output wave for movement of the mirror to construct an output wave array with output elements corresponding to the target elements;
    identifying errors between the target elements and the output elements; and
    modifying the drive elements in the drive array to attempt to minimize the errors when driving the MEMS on subsequent drive cycles, wherein modifications to the drive elements in the drive array are at least partially based on an impulse response for each output element determined by individually driving the input of the driver with an impulse input for each of the drive elements.

2. The method of claim 1, wherein modifying the drive elements comprises solving a set of linear equations defining n response outputs to n inputs to the driver.

3. The method of claim 2, wherein solving the set of linear equations comprises applying a matrix to the errors.

4. The method of claim 1, wherein sampling a time domain output wave for the movement of the mirror to construct an output wave array with output elements corresponding to the target elements comprises sampling of movement of the mirror using a Piezo-resistive strain sensor.

5. The method of claim 1, further comprising:
    identifying errors between the drive elements and the output elements; and
    driving the MEMS to reduce the errors between the drive elements and the output elements.

6. The method of claim 1, wherein the target wave array models a modified sawtooth wave.

7. A system comprising:
    a MEMS based projector comprising a mirror;
    one or more processors; and
    one or more computer-readable media having stored thereon instructions that are executable by the one or more processors to configure the system to control the mirror in the MEMS based projector, including instructions that are executable to configure the system to perform at least the following:
    input a time domain target wave array, with target elements, to a system for a MEMS coupled to the mirror of the projector, the time domain target wave array comprising a set of n target elements;
    drive a driver to move the mirror using elements in a drive array comprising a set of drive elements;
    sample a time domain output wave for movement of the mirror to construct an output wave array with output elements corresponding to the target elements;
    identify errors between the target elements and the output elements; and
    modify the drive elements in the drive array to attempt to minimize the errors when driving the MEMS on subsequent drive cycles, wherein modifications to the drive elements in the drive array are at least partially based on an impulse response for each output element determined by individually driving the input of the driver with an impulse input for each of the drive elements.

8. The system of claim 7, wherein modifying the drive elements comprises solving a set of linear equations defining n response outputs to n inputs to the driver.

9. The system of claim 8, wherein solving the set of linear equations comprises applying a matrix to the errors.

10. The system of claim 7, wherein sampling a time domain output wave for the movement of the mirror to construct an output wave array with output elements corresponding to the target elements comprises sampling of movement of the mirror using a Piezo-resistive strain sensor.

11. The system of claim 7, wherein one or more computer-readable media further have stored thereon instructions that are executable by the one or more processors to configure the computer system to perform at least the following:
    identify errors between the drive elements and the output elements; and drive the MEMS to reduce the errors between the drive elements and the output elements.

12. The system of claim 7, wherein the target wave array models a modified sawtooth wave.

13. A computer readable storage medium having stored thereon instructions that are executable by one or more processors to configure a computer system to control a mirror in a MEMS based projector, including instructions that are executable to configure the computer system to perform at least the following:
   input a time domain target wave array, with target elements, to a system for a MEMS coupled to the mirror of the projector, the time domain target wave array comprising a set of n target elements;
   drive a driver to move the mirror using elements in a drive array comprising a set of drive elements;
   sample a time domain output wave for movement of the mirror to construct an output wave array with output elements corresponding to the target elements;
   identify errors between the target elements and the output elements; and
   modify the drive elements in the drive array to attempt to minimize the errors when driving the MEMS on subsequent drive cycles, wherein modifications to the drive elements in the drive array are at least partially based on an impulse response for each output element determined by individually driving the input of the driver with an impulse input for each of the drive elements.

14. The computer readable storage medium of claim 13, wherein modifying the drive elements comprises solving a set of linear equations defining n response outputs to n inputs to the driver.

15. The computer readable storage medium of claim 14, wherein solving the set of linear equations comprises applying a matrix to the errors.

16. The computer readable storage medium of claim 13, wherein sampling a time domain output wave for the movement of the mirror to construct an output wave array with output elements corresponding to the target elements comprises sampling of movement of the mirror using a Piezoresistive strain sensor.

17. The computer readable storage medium of claim 13, wherein one or more computer-readable media further have stored thereon instructions that are executable by the one or more processors to configure the computer system to perform at least the following:
   identify errors between the drive elements and the output elements; and
   drive the MEMS to reduce the errors between the drive elements and the output elements.

* * * * *